US008766199B2

(12) United States Patent
Chappo et al.

(10) Patent No.: US 8,766,199 B2
(45) Date of Patent: Jul. 1, 2014

(54) RADIATION DOSE BASED IMAGING DETECTOR TILE PARAMETER COMPENSATION

(75) Inventors: Marc A. Chappo, Elyria, OH (US); Randall P. Luhta, Highland Heights, OH (US); Rodney A. Mattson, Mentor, OH (US)

(73) Assignee: Koninklijke Philips N.V., Eindhoven (NL)

( * ) Notice: Subject to any disclaimer, the term of this patent is extended or adjusted under 35 U.S.C. 154(b) by 112 days.

(21) Appl. No.: 13/510,168

(22) PCT Filed: Nov. 18, 2010

(86) PCT No.: PCT/IB2010/055267
§ 371 (c)(1),
(2), (4) Date: May 16, 2012

(87) PCT Pub. No.: WO2011/073819
PCT Pub. Date: Jun. 23, 2011

(65) Prior Publication Data
US 2012/0313000 A1 Dec. 13, 2012

Related U.S. Application Data

(60) Provisional application No. 61/286,412, filed on Dec. 15, 2009.

(51) Int. Cl.
*G01T 1/02* (2006.01)
*G01T 7/00* (2006.01)

(52) U.S. Cl.
CPC ..................................... *G01T 7/005* (2013.01)
USPC .................................................... 250/370.07

(58) Field of Classification Search
USPC .................................................... 250/370.07
See application file for complete search history.

(56) References Cited

U.S. PATENT DOCUMENTS

| | | | | |
|---|---|---|---|---|
| 4,052,620 | A | 10/1977 | Brunnett | |
| 6,510,195 | B1 | 1/2003 | Chappo et al. | |
| 6,671,345 | B2 | 12/2003 | Vrettos et al. | |
| 7,601,961 | B2 | 10/2009 | Franklin et al. | |
| 2003/0039579 | A1 | 2/2003 | Lambert et al. | |
| 2004/0114725 | A1 | 6/2004 | Yamamoto | |
| 2006/0067474 | A1 | 3/2006 | Schmitt | |
| 2008/0023638 | A1* | 1/2008 | Starman et al. | 250/371 |
| 2008/0298541 | A1 | 12/2008 | Mattson et al. | |

(Continued)

FOREIGN PATENT DOCUMENTS

| | | | |
|---|---|---|---|
| DE | 10239804 | A1 | 3/2004 |
| DE | 102006033716 | A1 | 2/2008 |

OTHER PUBLICATIONS

Luhta, R., et al.; A new 2D-tiled detector for multislice CT; 2006; Physics of Medical Imaging; vol. 6142; pp. 275-286.

(Continued)

*Primary Examiner* — David Porta
*Assistant Examiner* — Hugh H Maupin

(57) ABSTRACT

A detector tile (116) of an imaging system (100) includes a photosensor array (204) and electronics (208) electrically coupled to the photosensor array (204), wherein the electronics includes a dose determiner (402) that determines a deposited dose for the detector tile (116) and generates a signal indicative thereof. In one non-limiting instance, this signal is utilized to correct parameters such as gain and thermal coefficients, which may vary with radiation dose.

23 Claims, 7 Drawing Sheets

(56) References Cited

U.S. PATENT DOCUMENTS

| | | | |
|---|---|---|---|
| 2009/0034683 | A1 | 2/2009 | Tamakoshi |
| 2009/0121146 | A1 | 5/2009 | Luhta et al. |
| 2011/0049381 | A1 | 3/2011 | Luhta et al. |
| 2012/0001076 | A1 | 1/2012 | Chappo et al. |

OTHER PUBLICATIONS

Zhao, W., et al.; Digital radiology using active matrix readout of amorphous selenium: Radiation hardness of cadmium selenide thin film transistors; 1998; Med. Phys.; 25(4)527-538.

* cited by examiner

RECONSTRUCTOR
CONSOLE
120
122
118
108
106
104
112
100
102
116
114
Z

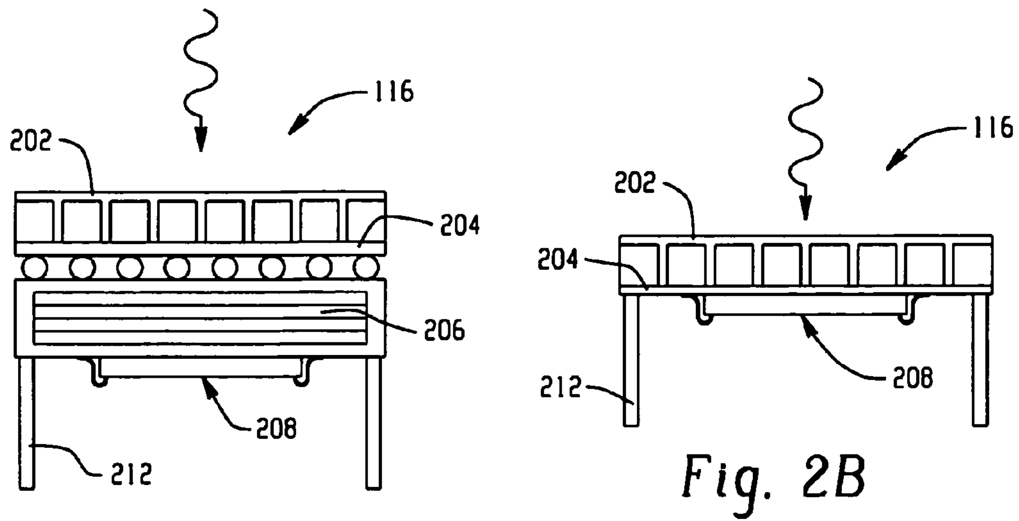
Fig. 2A
Fig. 2B
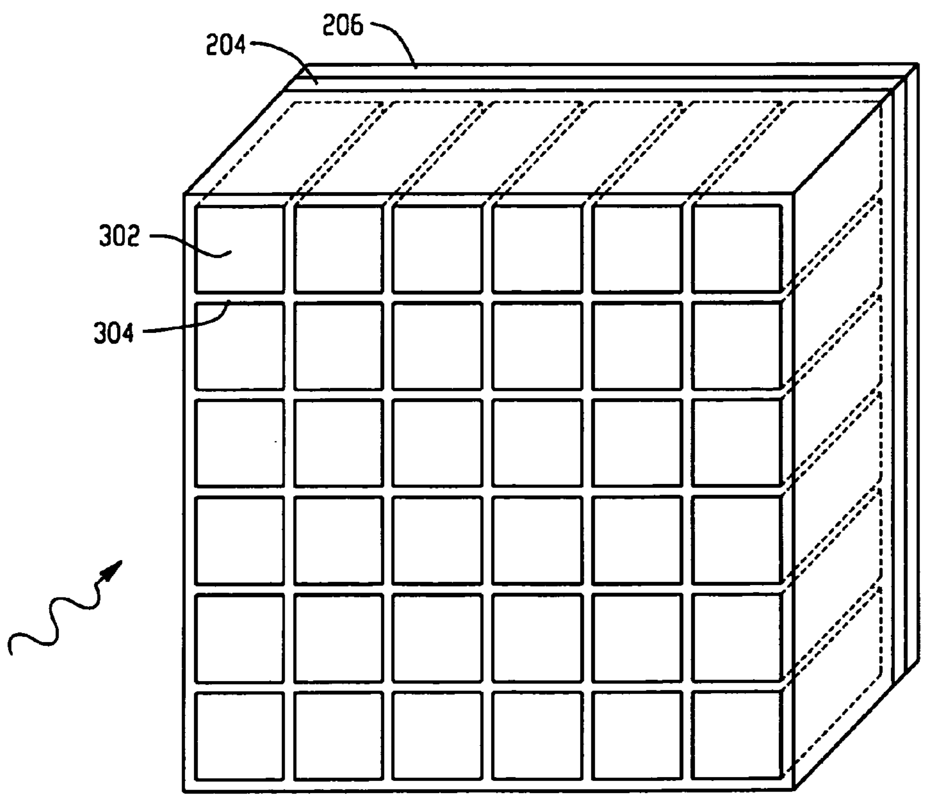
Fig. 3

RADIATION DOSE BASED IMAGING DETECTOR TILE PARAMETER COMPENSATION

CROSS REFERENCE TO RELATED APPLICATIONS

This application claims the benefit of U.S. provisional application Ser. No. 61/286,412 filed Dec. 15, 2009, which is incorporated herein by reference.

The following generally relates to compensating various operational parameters of a detector tile based on deposited dose and finds particular application to computed tomography (CT). However, it also amenable to other medical imaging applications and to non-medical imaging applications.

A computed tomography (CT) scanner includes an x-ray tube mounted on a rotatable gantry that rotates around an examination region about a longitudinal or z-axis. The x-ray tube emits ionizing radiation that traverses the examination region and a subject or object therein. A detector array subtends an angular arc opposite the examination region from the x-ray tube. The detector array detects radiation that traverses the examination region and generates a signal indicative thereof. A reconstructor recdnstructs volumetric image data indicative of the signal. The volumetric image data can be further processed to generate one or more images of the subject or object.

Depending on the scanner, the detector array may include integrating and/or photon counting radiation sensitive pixels. In one instance, the detector array includes a plurality of detector modules, each module including a plurality of detector tiles. A detector tile has included a scintillator optically coupled to a two-dimensional photosensor array, which is electrically coupled to electronics. The response of the various components of the tile is sensitive to and may vary with radiation exposure. As such, operational parameters such as gain, thermal coefficient, etc. of the various components and thus the tile may change over time as the scanner is used to scan object and/or subjects and the tile is illuminated with radiation.

Unfortunately, the varying response of the operational parameters may lead to artifacts being introduced into the image data.

Aspects of the present application address the above-referenced matters and others.

According to one aspect, a detector tile of an imaging system includes a photosensor array and electronics electrically coupled to the photosensor array, wherein the electronics includes a dose determiner that determines a deposited dose for the detector tile and generates a signal indicative thereof.

In another embodiment, a method includes sensing radiation illuminating a detector tile of an imaging system, generating a signal indicative of the sensed radiation, and correcting a parameter of electronics of the detector tile based at least in part on the signal.

In another embodiment, a method includes correcting a parameter of electronics of a detector tile based at least in part on a sensed lifetime radiation dose of the detector tile.

The invention may take form in various components and arrangements of components, and in various steps and arrangements of steps. The drawings are only for purposes of illustrating the preferred embodiments and are not to be construed as limiting the invention.

FIGS. 2A and 2B illustrate example detector tiles of a detector module.

FIG. 3 illustrates an example two-dimensional photosensor array and anti-scatter grid of the detector tile.

FIGS. 8, 9, 10, and 11 illustrates exemplary placement of a radiation sensor in connection with the electronics.

Figure 12:
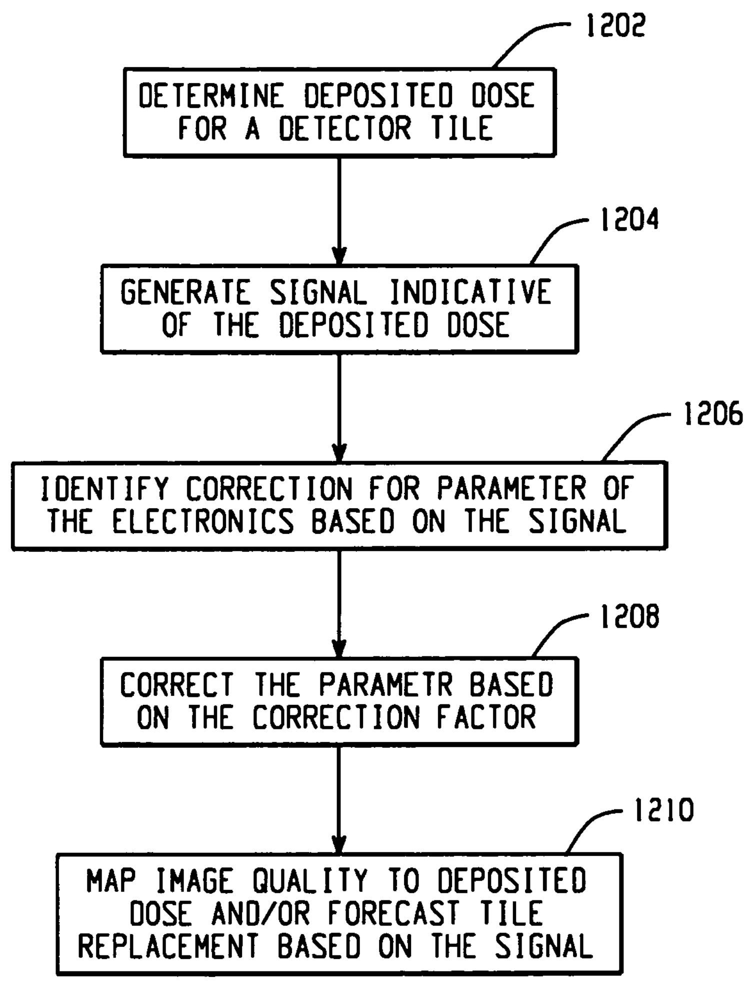

FIG. 12 illustrates a method.

Figure 1:
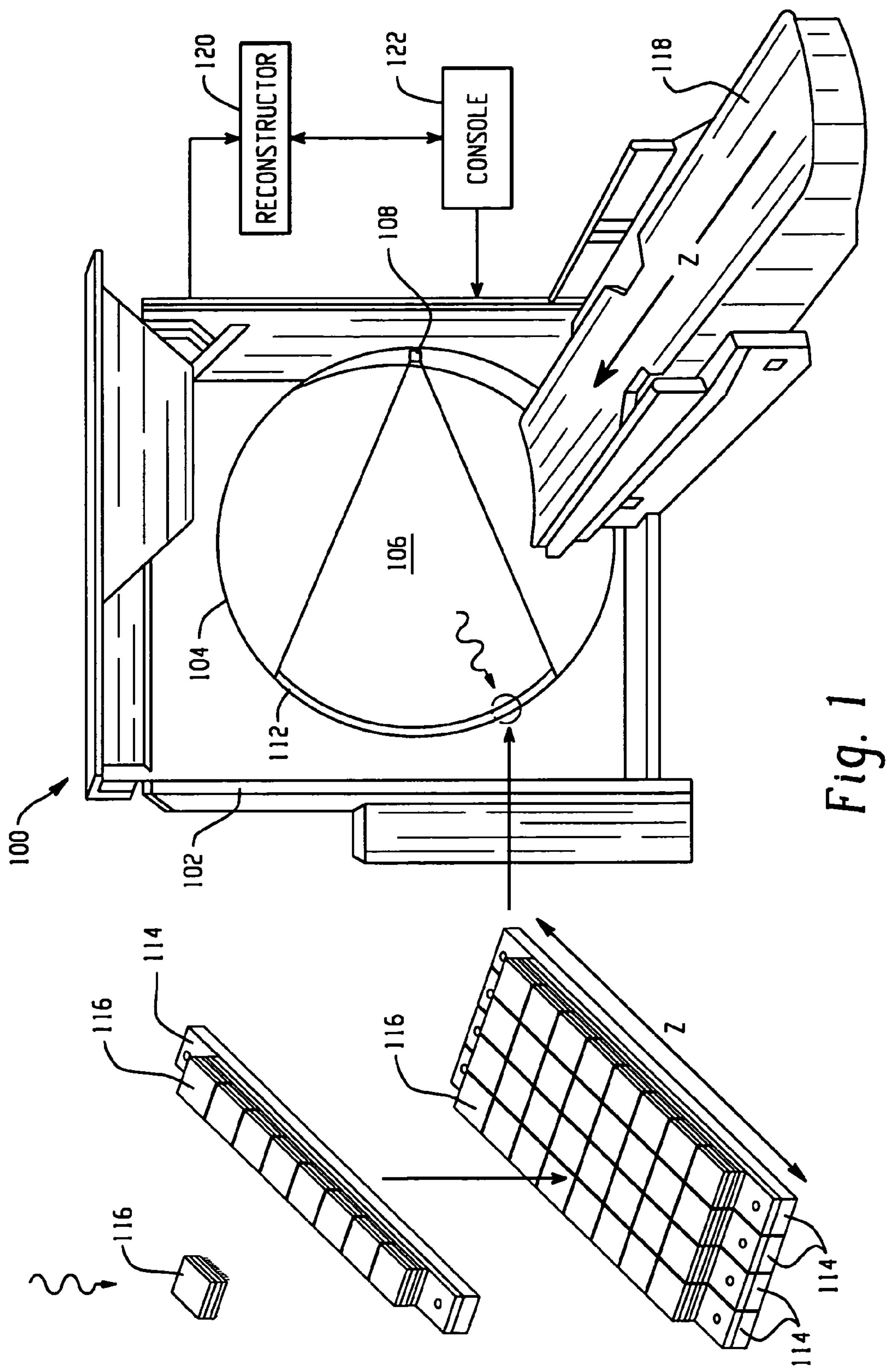
FIG. 1 illustrates an example imaging system with a detector array that includes a plurality of detector modules.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis. A radiation source 108 such as an x-ray tube is supported by and rotates with the rotating gantry 104 and emits radiation that traverses the examination region 106.

A radiation sensitive detector array 112 subtends an angular arc opposite the radiation source(s) 108 across the examination region 106 and detects radiation traversing the examination region 106. In the illustrated embodiment, the radiation sensitive detector array 112 includes a plurality of detector modules 114 arranged with respect to each other along a direction transverse to the z-axis. As shown, a detector module 114 includes a plurality of detector mosaics or tiles 116 arranged with respect to each other along the z-axis. A non-limiting example of such a detector array is described in greater detail in U.S. Pat. No. 6,510,195B1, filed Jul. 18, 2001, and entitled "Solid State X-Radiation Detector Modules and Mosaics thereof, and an Imaging Method and Apparatus Employing the Same," which is incorporated herein by reference in its entirety.

As shown in FIG. 2A, a tile 116 of the illustrated detector array 112 includes a scintillator array 202 with a first side that faces radiation traversing the examination region 106 and a second side that is physically and optically coupled to a two-dimensional photosensor array 204. As shown in FIG. 3, the two-dimensional photosensor array 204 includes an N×M arrangement of detector pixels 302 and a corresponding two-dimensional anti-scatter grid 304, which includes lamella that surrounds the individual detector pixels 302. The number of detector pixels 302 in FIG. 3 is for explanatory purposes and not limiting. Returning to FIG. 2A, the illustrated two-dimensional photosensor array 204 is electrically coupled to electronics 208 through a substrate 206. Electrical pathways 212 such as connector pins or the like carry power supplies and digital I/O signals.

A non-limiting example of such a tile 116 is described in greater detail in "A New 2D-Tiled Detector for Multislice CT," Luhta et al., Medical Imaging 2006: Physics of Medical Imaging, Vol. 6142, pp. 275-286 (2006). FIG. 2B illustrates an alternative embodiment of the tile 116 in which the substrate 206 is omitted and the electronics 208 are coupled to the photosensor array 204, thereby precluding radiation shielding. As noted above, the response of the various components of the tile 116 is sensitive to and may vary with radiation exposure. Therefore, the tile response in this embodiment, relative to an embodiment with radiation shielding, is more likely to be affected by radiation exposure. A non-limiting example of such a tile 116 is described in patent application Ser. No. 12/293,842, publication number US2009/0121146

A1, filed on Mar. 30, 2006, and entitled "Radiation Detector Array," which is incorporated in its entirety by reference herein. In yet another embodiment, the tile 116 includes a direction conversion material (e.g., CdTe), and the electronics 208 are coupled to the direction conversion material.

Figure 4:
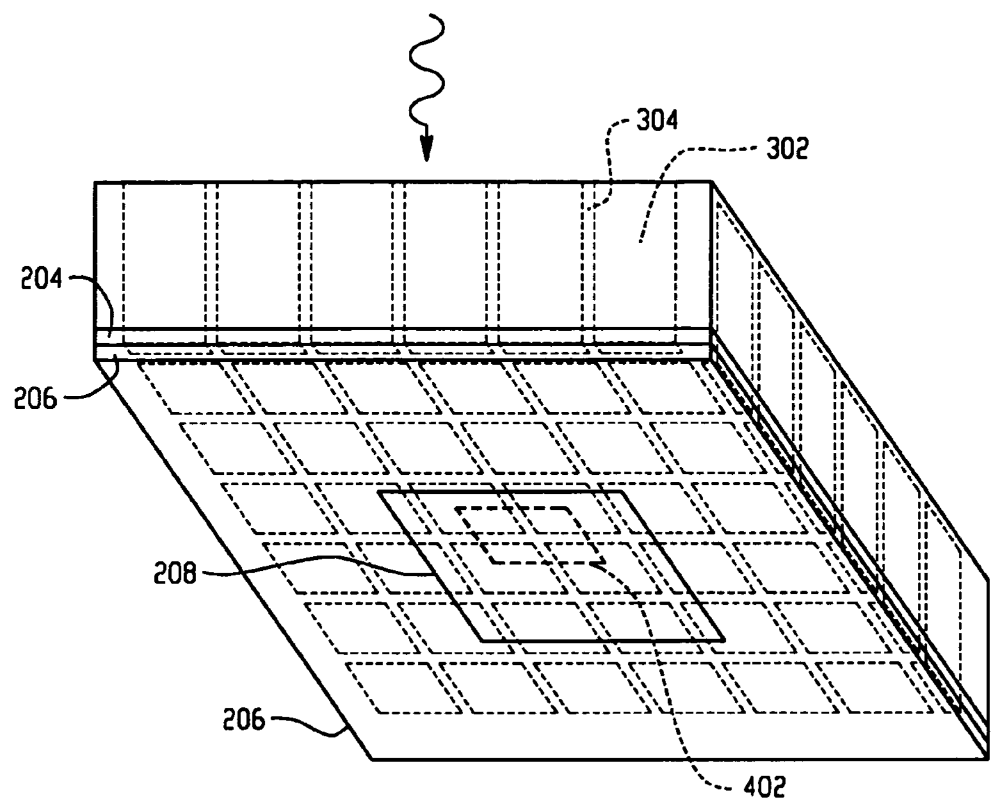
FIG. 4 illustrates the two-dimensional photosensor array with electronics electrically coupled thereto.

As shown in FIG. 4, the illustrated electronics 208 includes a dose determiner 402 that determines a lifetime deposited dose for the detector tile 116 and generates a signal indicative thereof. As described in greater detail below, the dose determiner 402 includes one or more components that sense radiation illuminating one or more portions of the detector tile 116 and determines the signal based on the sensed radiation. The signal can be used to compensate or correct operational parameters (e.g., such gain, a thermal coefficient, etc.) of the tile 116 that may vary with deposited dose over the lifetime of the tile 116 in the imaging system 100. Although not shown, the electronics 208 include various other components.

Figure 5:
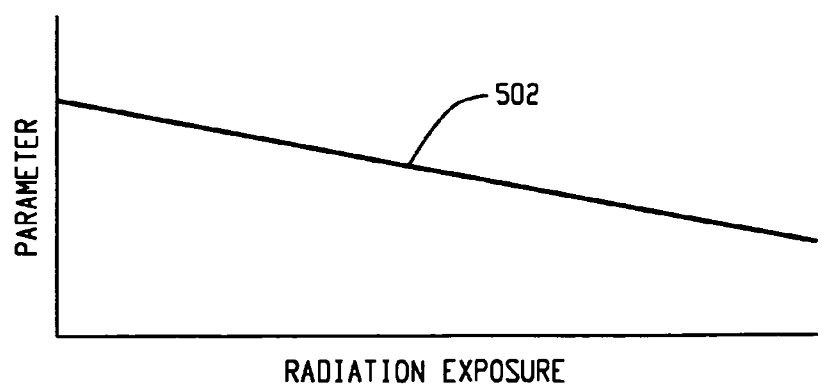
FIG. 5 illustrates a plot of a parameter of the electronics as a function of radiation exposure.

FIG. 5 depicts a curve 502 that generally shows the relationship of the behavior of such a parameter as a function of radiation exposure. In this example, the parameter linearly decreases with increased radiation exposure. By way of more particular example, the gain of a detector pixel 302 may decrease by 0.1 from 1.0 to 0.9 after a particular amount of radiation exposure. In another example, a thermal coefficient of the scintillator 202 and/or photosensor array 204 may decrease by 0.1%/C from 0.2%/C to 0.1%/C after a particular amount of radiation exposure. Of course, other parameters with other shaped curves (e.g., non-linear, increasing, etc.) are contemplated herein. The particular curve can be determined for a particular tile 116 via lifetime testing of the tile, manufacturer specifications, and/or otherwise.

Returning to FIG. 1, the resulting signal may also be used to correlate observable image quality degradation (e.g., artifacts) with deposited dose for a tile 116 and/or forecast or predict when a tile 116 may need to be replaced based on deposited dose.

A patient support 118, such as a couch, supports an object or subject such as a human patient in the examination region 106. The patient support 118 is configured to move the object or subject in and/or out of the examination region 106 before, during and/or after scanning the object or subject.

A reconstructor 120 reconstructs the signal from the detector array 112 and generates volumetric image data indicative thereof. The volumetric image data can be further processed to generate one or more images, which can be presented via a display, filmed, or otherwise output.

A general-purpose computing system serves as an operator console 122. The console 122 includes one or more processors that execute one or more computer readable instructions (software) stored or encoded in computer readable storage medium local or remote to the system 100. Software resident on the console 122 allows the operator to control operation of the system 100 initiating scanning, etc. The console 122 also includes an output device such as display and an input device such as a keyboard, mouse, touch screen, etc.

Figure 6:
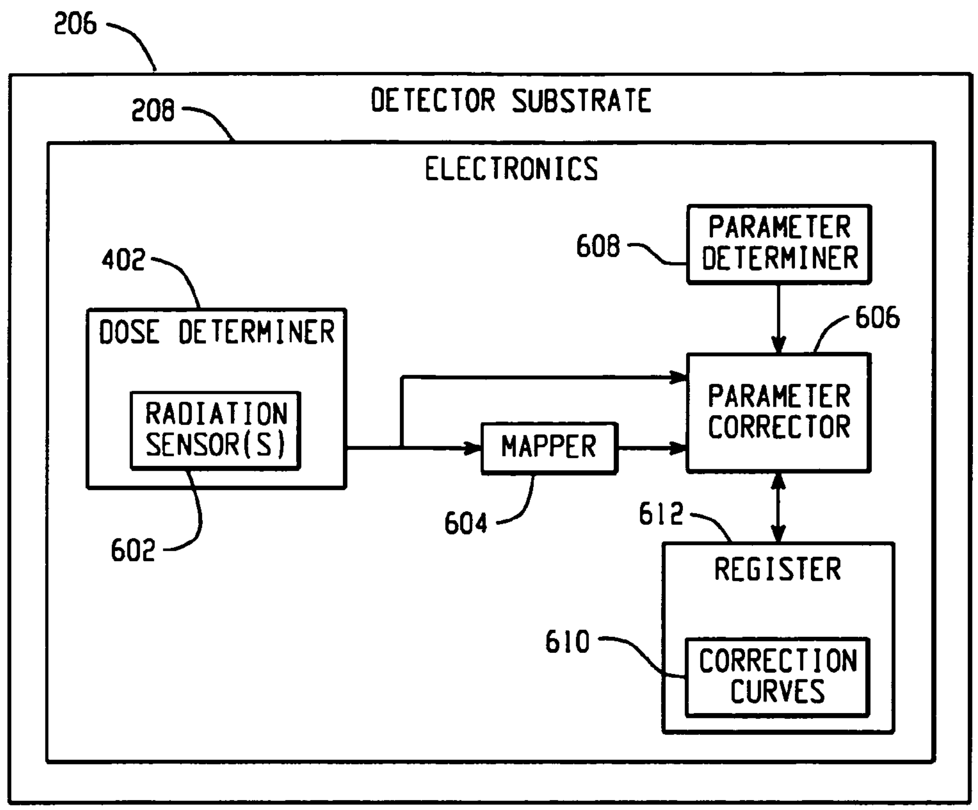
FIG. 6 illustrates example electronics of a tile.

Turning to FIG. 6, example electronics 208 of the tile 116 are illustrated. In this example, the electronics 208 include the dose determiner 402 discussed above. The illustrated dose determiner 402 includes at least one radiation sensor 602 that senses radiation traversing the examination region 106 and illuminating the tile 116 and produces an output indicative of the sensed radiation. The illustrated at least one radiation sensor 602 may include a metal-oxide-semiconductor field-effect transistor (MOSFET) or other electrical component with an electrical characteristics that changes in a known or measureable manner due to radiation exposure.

Figure 7:
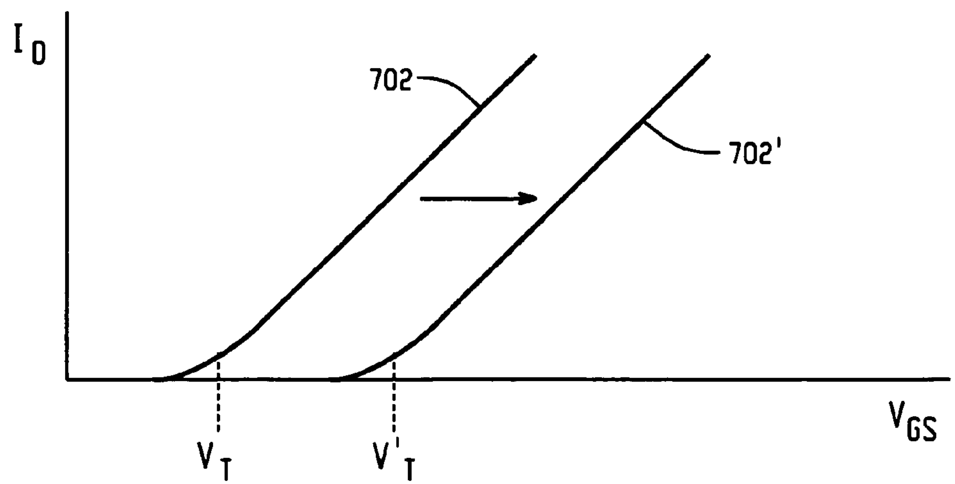
FIG. 7 illustrates example behavior of a radiation sensor of the electronics as a function of radiation exposure.

FIG. 7 shows an example of how the threshold voltage of a MOSFET changes based on radiation exposure. As shown, a first curve 702 represents drain current ($I_D$) as a function of a gate-source voltage ($V_{GS}$) with a first threshold voltage ($V_T$) prior to exposure to radiation or with first radiation exposure. A second curve 702' represents drain current ($I_D$) as a function of a gate-source voltage ($V_{GS}$) with a second threshold voltage ($V'_T$) after a particular amount of radiation exposure or with second radiation exposure. As shown, the second curve 702' is shifted from the first curve 702, shifting the second threshold voltage ($V'_T$) from the first threshold voltage ($V_T$). The shift is measurable and proportional to radiation exposure and thus the shift at any given time can be used to determine information indicative of the deposited dose at that time.

Returning to FIG. 6, a mapper 604 maps the shift to a value representing radiation dose such as a value indicative of a deposited dose in a unit representing absorbed radiation dose such as a gray, rad, curie, rem, or other unit. A parameter corrector 606 corrects parameters (e.g., gain, thermal coefficient, etc.) determined by a parameter determiner 608 based on one or more correction curves 610 in a register 612 and the value generated by mapper 604. The parameter determiner 608 can determine parameters such as a gain, a thermal coefficient, etc. as described in patent application Ser. No. 61/163,493, filed Mar. 26, 2009, and entitled "Data Acquisition," and patent application Ser. No. 61/237,056, filed Aug. 26, 2009, and entitled "Imaging Detector Thermal Controls," both of which are incorporated herein by reference in their entireties.

Examples of suitable curves include a curve that shows how gain varies as a function of radiation exposure, a curve that shows how a thermal coefficient varies as a function of radiation exposure, etc. As noted above, such curves can be based on testing, manufacturing specifications, and/or otherwise. The parameter determiner 608 can identify a correction factor for the gain, thermal coefficient, etc. from the curve based on the value and correct the corresponding parameter from the parameter determiner 608 via the correction factor. Additionally or alternatively, the register 612 may store a correction factor look-up table (LUT), mathematical function, etc. that can used to determine the correction factor based on the value, and/or other information that can be used to determine the correction factor. In another embodiment, the mapper 604 is omitted, and the measured shift is used to determine the correction factor from the curve, table, mathematical function, etc.

The value indicative of the deposited dose and/or the shift may be stored in the register 612 and/or another register, and read out, if desired. A read out value can be used to correlate observable image quality degradation with deposited dose for a tile 116. For example, a log can be created that includes information such as a type of artifact, a degree of the artifact, lot number, manufacturer, etc. along with the read out deposited dose value. A statistical or other analysis can be performed on the log to create information such as a distribution showing tile replacement and/or type of artifact as a function radiation exposure. Such information may facilitate identifying a suspect lot of tiles, forecasting or predicting when a tile installed in a system may need to be replaced, etc. Such information may be provided to various personnel such as purchasing, manufacturing, service, etc.

In the illustrated embodiment, the radiation sensor 602, the dose determiner 402, the mapper 604, the parameter determiner 608, the parameter corrector 606 and the register 612 are all located within the electronics 208 of the detector tile 116. In other embodiments, one or more of the aforementioned components can be located outside of the electronics 208. By way of non-limiting example, in another embodiment, the mapper 604, the parameter determiner 608, the parameter corrector 606, and the register 612 are located outside of the tile 116, for example, in connection with the reconstructor 120, the console 122, and/or other computing device.

Figure 8:
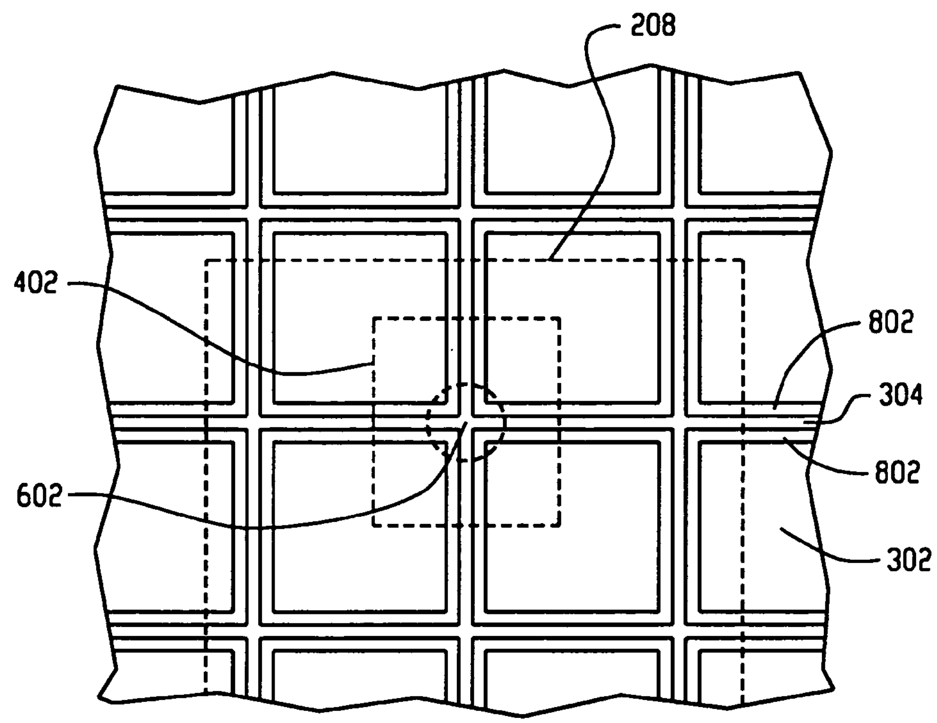

FIG. 8 illustrates a non-limiting example of placement of a single radiation sensor 602 in the dose determiner 402. As discussed above, the photosensor array 204 includes a two-dimensional array of detector pixels 302 and a two-dimensional anti-scatter grid 304 with lamella that surrounds the individual detector pixels 302. As shown in FIG. 8, there is an interstice 802 (or gap) between a lamella of the anti-scatter grid 304 and a corresponding neighboring detector pixel(s) 302. Some of radiation illuminating a tile 116 above the dose determiner 402 may traverse the interstice 802 and strike the dose determiner 402. In FIG. 8, the single radiation sensor 602 is located at an interstice junction for interstices 802 for four (4) detector pixels 302. It is to be appreciated the relationship between the various elements in FIG. 8, such as a relative width of the interstices 802, is for explanatory purposes and may or may not reflect an actual relationship.

Figure 9:
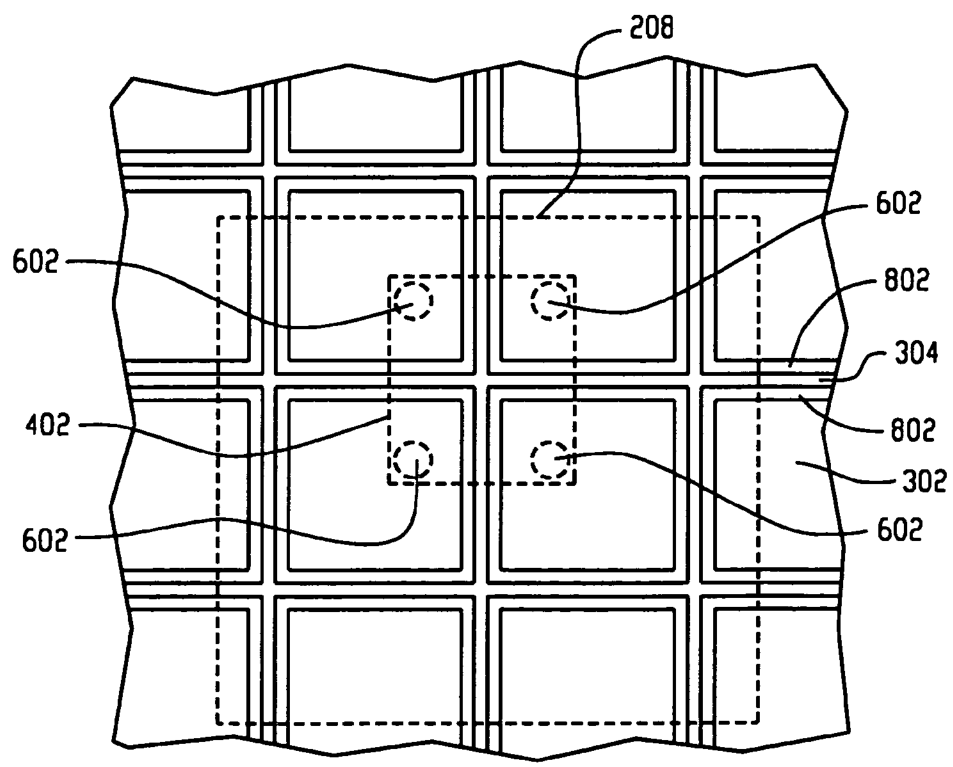
Figure 10:
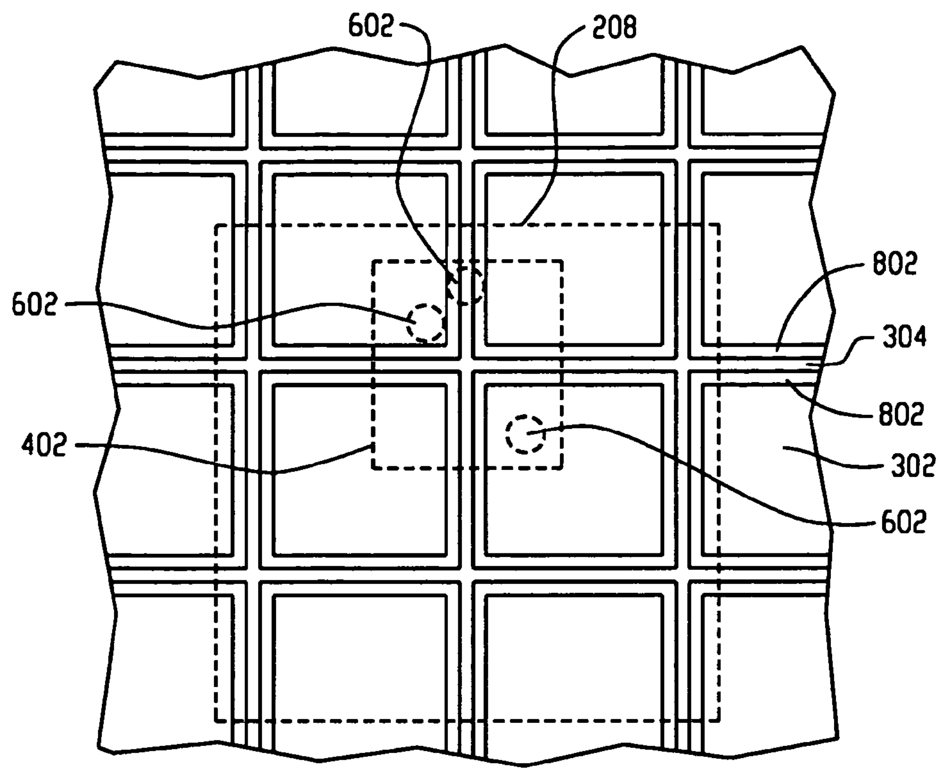
Figure 11:
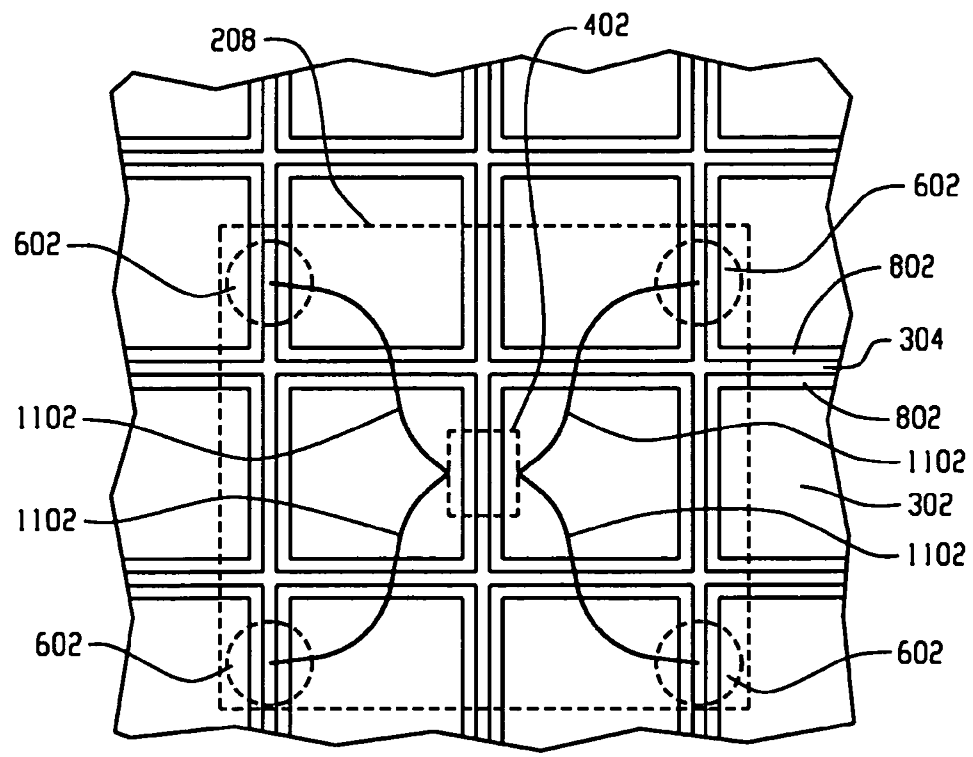

FIGS. 9, 10, and 11 illustrate various other non-limiting locations for the one or more radiation sensors 602. In FIG. 9, four (4) radiation sensors 602 are placed at the four (4) corners of the dose determiner 402, none under an interstice 802. The signal generated by the dose determiner 402 may be an average or other combination of the signals from the four (4) radiation sensors 602. In another embodiment, one or more of the radiation sensors 602 may be provided for redundancy, as a backup sensor, etc. FIG. 10 shows an embodiment with three (3) radiation sensors 602, including one (1) radiation sensor 602 under an interstice 802 and two (2) radiation sensors 602 positioned elsewhere. In FIG. 11, the radiation sensors 602 are located on the electronics 208, outside of the dose determiner 402, and conductive pathways 1102 route the signals to the dose determiner 402.

Other locations and/or groupings are also contemplated, including combinations and/or subcombinations of the illustrated examples.

FIG. 12 illustrates an example method.

At 1202, at least one radiation sensor 602 of the dose determiner 402 senses radiation illuminating the detector tile 116 over a lifetime of the detector tile 116 in the imaging system 100. As described above, at least one of the sensors 602 may be located under an interstice 802 and/or at least one of the sensors 602 may be otherwise located.

At 1204, the dose determiner 402 generates a signal indicative of the sensed radiation.

At 1206, the signal is used to identify a correction factor for a parameter of the electronics. The parameter can be related to a gain, a thermal coefficient, a temperature, etc. of the electronics 208.

At 1208, the parameter is corrected based on the correction factor.

Optionally, at 1210, the signal can be used to correlate observable image quality degradation with deposited dose for a tile 116 and/or forecast or predict when a tile 116 may need to be replaced based on deposited dose.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A detector tile of an imaging system, comprising:
a photosensor array;
electronics electrically coupled to the photosensor array, the electronics including:
a dose determiner that determines a deposited dose for the detector tile and generates a signal indicative thereof; and
a parameter corrector that corrects an operational parameter of the electronics based on the signal.

2. The detector tile of claim 1, wherein the operational parameter includes at least one of a gain or a thermal coefficient for the electronics.

3. The detector tile of claim 1, further comprising:
a register with correction data, wherein the parameter corrector identifies a correction factor based on the correction data and the signal, and corrects the operational parameter based on the correction factor.

4. The detector tile of claim 3, wherein the correction data includes at least one of a correction curve, a correction look-up table, or a correction mathematical function that describes the operational parameter as a function of radiation exposure.

5. The detector tile of claim 3, wherein the correction data is determined based on at least one of lifetime testing of the tile or manufacturing specifications.

6. The detector tile of claim 1, further comprising:
a mapper that maps the signal to a value indicative of absorbed dose.

7. The detector tile of claim 6, wherein the value is stored in a readable register.

8. The detector tile of claim 1, wherein the dose determiner includes at least one radiation sensor that senses radiation illuminating the tile and generates the signal based on the sensed radiation.

9. The detector tile) of claim 8, wherein the at least one radiation sensor includes an electrical component with an electrical characteristics that changes in a known or measureable manner due to radiation exposure.

10. The detector tile of claim 9, wherein the at least one radiation sensor includes a metal-oxide-semiconductor field-effect transistor.

11. The detector tile of claim 8, the photosensor array, comprising:
at least one detector pixel; and
at least one anti-scatter grid lamella disposed adjacent to a side of the at least one detector pixel and separated therefrom by a interstice having a non-zero width.

12. The detector tile of claim 11, wherein a first of the at least one radiation sensor is located under and senses radiation traversing the interstice.

13. The detector tile of claim 11, wherein a second of the at least one radiation sensor senses radiation traversing the detector pixel.

14. A method, comprising:
sensing radiation illuminating a detector tile of an imaging system;
generating a signal indicative of the sensed radiation; and
correcting a parameter of electronics of the detector tile based at least in part on the signal.

15. The method of claim 14, wherein the parameter includes at least one of a gain or a thermal coefficient for the electronics.

16. The method of claim 15, further comprising:
correcting the parameter based on a correction factor determined from at least one of a correction curve, a correction look-up table, or a correction mathematical function based on the signal.

17. The method of claim 14, further comprising:

sensing at least one of radiation traversing an interstice located between a first detector pixel of the tile and an anti-scatter lamella of the tile or radiation traversing a second detector pixel of the tile.

18. The method of claim 14, wherein the radiation is sensed via an electrical component with electrical characteristics that change in a known or measureable manner due to radiation exposure.

19. The method of claim 14, further comprising:

sensing radiation for a plurality of imaging acquisitions performed at different moments times; and generating values indicative of the sensed radiation respectively for all or a subset of the plurality of the imaging acquisitions.

20. The method of claim 19, further comprising:

generating a distribution of tile replacement as a function of tile radiation exposure based on the stored values.

21. The method of claim 19, further comprising:

generating a distribution of image artifact as a function of tile radiation exposure based on the stored values.

22. The method of claim 19, further comprising:

determining when to replace the tile based on the stored values.

23. A method, comprising:

correcting a parameter of electronics of a detector tile based at least in part on a sensed lifetime radiation dose of the detector tile.

* * * * *